United States Patent
Sartorius et al.

(10) Patent No.: US 8,880,860 B2
(45) Date of Patent: Nov. 4, 2014

(54) METHODS AND APPARATUS FOR SAVING CONDITIONS PRIOR TO A RESET FOR POST RESET EVALUATION

(75) Inventors: Thomas Andrew Sartorius, Raleigh, NC (US); Subodh Singh, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 13/309,623

(22) Filed: Dec. 2, 2011

(65) Prior Publication Data

US 2013/0145137 A1 Jun. 6, 2013

(51) Int. Cl.
*G06F 15/177* (2006.01)

(52) U.S. Cl.
USPC .......... 713/1; 713/2; 713/100; 711/162; 714/25; 714/47.1

(58) Field of Classification Search
USPC .......... 713/1, 2, 100; 711/162; 714/25, 47.1
See application file for complete search history.

(56) References Cited

U.S. PATENT DOCUMENTS

| | | | |
|---|---|---|---|
| 5,768,496 A * | 6/1998 | Lidgett et al. | 714/25 |
| 6,694,452 B1 * | 2/2004 | Kitao | 714/23 |
| 6,968,469 B1 | 11/2005 | Fleischmann et al. | |
| 7,574,591 B2 | 8/2009 | Downer et al. | |
| 7,725,769 B1 * | 5/2010 | Staab | 714/22 |
| 7,730,330 B1 | 6/2010 | Fleischmann et al. | |
| 7,971,104 B2 | 6/2011 | Dolev et al. | |
| 8,392,642 B2 * | 3/2013 | Ageishi | 710/263 |
| 2003/0060964 A1 * | 3/2003 | Ozeki et al. | 701/114 |
| 2004/0044917 A1 | 3/2004 | Lee et al. | |
| 2006/0259753 A1 | 11/2006 | Lell et al. | |
| 2009/0164814 A1 | 6/2009 | Axford et al. | |
| 2009/0210657 A1 * | 8/2009 | Tung | 712/34 |
| 2010/0121988 A1 | 5/2010 | Lahti et al. | |
| 2011/0082959 A1 * | 4/2011 | Ageishi | 710/263 |

FOREIGN PATENT DOCUMENTS

DE 102009000874 A1 8/2010
GB 2281986 A 3/1995

OTHER PUBLICATIONS

International Search Report and Written Opinion—PCT/US2012/067652—ISA/EPO—Mar. 25, 2013.

* cited by examiner

*Primary Examiner* — M Elamin
(74) *Attorney, Agent, or Firm* — Peter Michael Kamarchik; Nicholas J. Pauley; Joseph Agusta

(57) ABSTRACT

A processor reset control circuit is configured to automatically capture a pre-reset value of processor information stored in one or more hardware registers, as part of a reset operation state machine and prior to changing the processor information to its architecturally required post reset value. Such pre-reset processor information includes, for example one or more pre-reset values of the processor program counter (PC) and one or more pre-reset values of an operating-state mode register, both of which may be captured in one or more pre-reset capture storage devices which are then made available for evaluation purposes. Such pre-reset capture storage devices store pre-reset information in response to the reset and maintain the stored pre-reset information until another reset occurs.

30 Claims, 3 Drawing Sheets

METHODS AND APPARATUS FOR SAVING CONDITIONS PRIOR TO A RESET FOR POST RESET EVALUATION

FIELD OF THE DISCLOSURE

The present disclosure relates generally to processing systems and more particularly, to techniques for saving conditions prior to a reset for post reset evaluation.

BACKGROUND

Many portable products, such as cell phones, laptop computers, tablet personal computers (PCs), personal data assistants (PDAs) or the like, incorporate a processing system having one or more processors executing programs that support communication and multimedia applications. The processing system for such products may also include complex memory systems for storing instructions and data, controllers, and peripheral devices configured to interface with the processors and memory over one or more busses.

In such a processing system, various conditions and circumstances can lead to the one or more processors receiving an unexpected reset, such that the processor ceases to execute a previously active software program, reinitializes a number of internal resources, and begins execution from an architecture defined instruction address. For example, a processor may have facilities for a software initiated reset, one or more hardware timeout circuits that may issue a reset due to detection of inactivity of busses or other monitored signaling, external circuits such as a voltage monitor reacting to a short lived brownout, and peripherals and debug circuits may also initiate a processor reset. During a processor reset, processor state information is initialized to a defined deterministic state. As a consequence of a reset, the processor state information just prior to the reset is lost. Thus, finding the cause of the reset, such as an unexpected reset, may not be easily determined.

SUMMARY

Among its several aspects, the present disclosure recognizes a need exists for providing more efficient methods and apparatuses for saving conditions prior to a reset, such as an unexpected reset, for post reset evaluation. To such ends, an embodiment of the invention addresses a method for saving pre-reset information in a processor. Processor information stored in a first element that is changed in response to a processor reset is saved to a second element in response to detection of a reset condition. The processor reset is initiated in response to the detection of the reset condition and after the processor information is saved in the second element, wherein the second element holds pre-reset processor information after the processor reset has occurred and the first element has been changed and the pre-reset processor information is accessible from the second element for evaluation after the processor reset has occurred.

Another embodiment addresses an apparatus. A reset detection circuit is configured to initiate a processor reset upon detecting an unexpected reset condition. A first storage element having pre-reset information and a second storage element that remains unchanged and accessible after the processor reset. A control circuit is configured to copy the pre-reset information from the first storage element to the second storage element prior to the first storage element being changed in response to the processor reset.

Another embodiment addresses a method for accessing conditions which occurred prior to a reset for post reset evaluation. Processor information stored in a first element is saved to a second element in response to an unexpected processor reset, wherein the second element holds pre-reset processor information after the unexpected processor reset has occurred and the first element has been changed in response to the unexpected processor reset. The pre-reset processor information is accessed from the second element to determine the pre-reset processor operating state.

It is understood that other embodiments of the present invention will become readily apparent to those skilled in the art from the following detailed description, wherein various embodiments of the invention are shown and described by way of illustration. It will be realized that the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
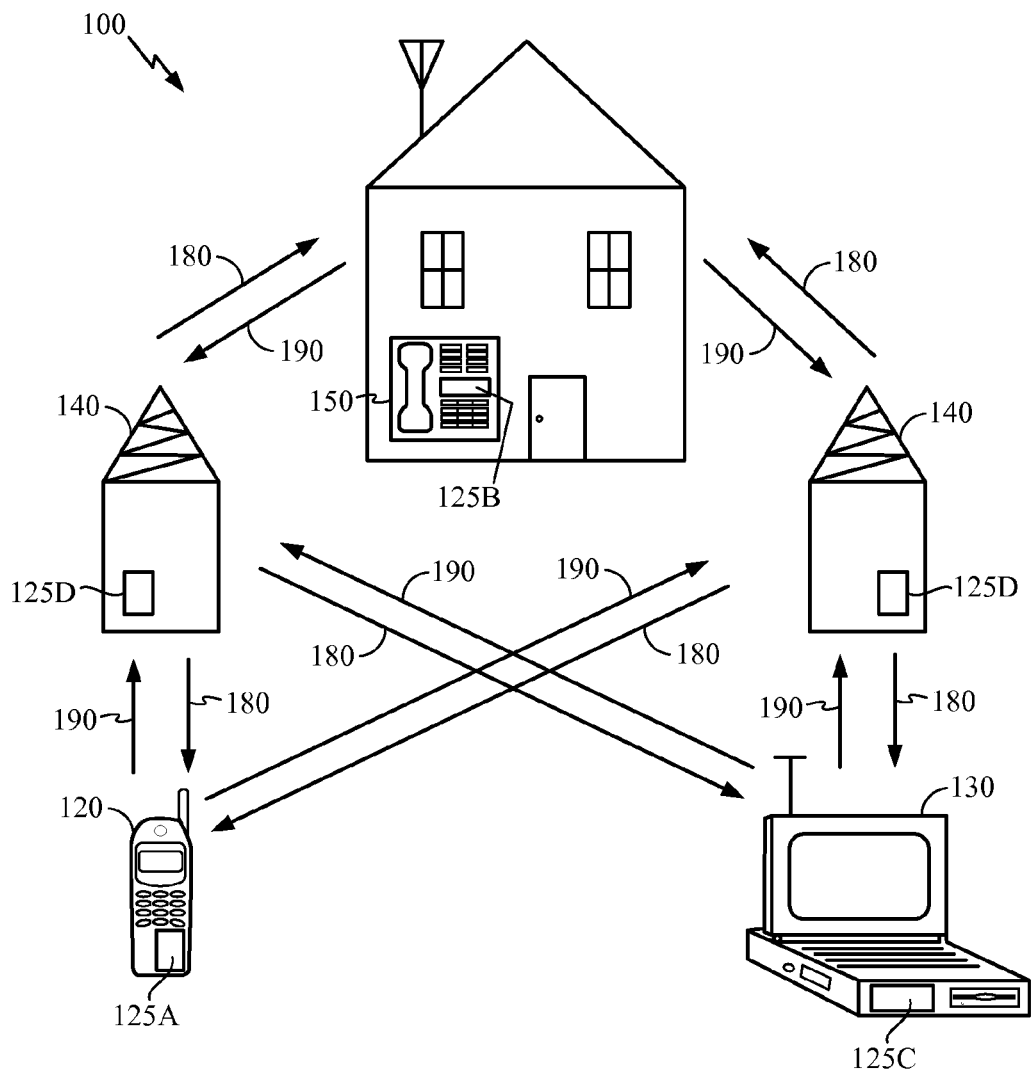
FIG. 1 illustrates a wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to incorporate embodiments of the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, smart phones, pagers, walkie talkies, handheld personal communication system (PCS) units, tablets, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processing system, such as utilized in the devices illustrated in FIG. 1.

A reset of a processing system may be generated for a number of reasons. For example, a reset is generally applied when power to the processing system is turned on which may occur on a first power on situation or when powering up from a power saving state. A reset may also be due to unexpected hardware or software failures, a result of noise, an external event, or the like. Generally, a reset is issued as part of a power on sequence to initialize the processing system to a known state. For example, a processor program counter (PC) that holds an address of a currently executing instruction is initialized upon receiving the reset to a predefined instruction address. As a consequence of the reset, the PC instruction address at which the processor was executing code just prior to the reset is lost. On a first power on situation, the PC address prior to the reset is of little or no value. However, on other types of resets, such as an unexpected reset, knowing the PC address prior to the reset may be useful for diagnostic purposes. An unexpected reset is generally not distinguishable from a first power on reset, for example.

The PC address prior to a reset is not the only information lost due to a reset. Additional processor information which may be pertinent to understanding what the processor was executing prior to being reset may also be lost. For example, an operating mode the processor was running under prior to the reset may be replaced with a specific operating mode, such as a supervisor operating mode, in response to the reset to further ensure the processing system begins executing in a deterministic fashion after the reset. While processors may have one or more operating modes, a commercial processor, such as an ARM processor for example, may execute in one of nine processing modes, which include a monitor, hypervisor, system, abort, supervisor, undefined, interrupt request (IRQ), fast interrupt request (FIQ), and user operating modes. An ARM processor generally enters the supervisor mode in response to a reset, overwriting the operating mode information in response to the reset.

Processor information may include a processor program counter (PC) address value and other internal system information, such as the operating mode, condition flags, interrupt masks, coprocessor state, and the like. While such processor information including the PC address value are indicative of processor state, the processor information may be prioritized into various levels of information useful to save, prior to resetting the processor, for post reset evaluation. For example, a basic level of pre-reset information may be the PC address vale and a second level of pre-reset information may include selected other pre-reset internal state values. For example, a system may include storage for only a pre-reset PC address value and another system may include a first storage element for the pre-reset PC address value and a second storage element for one of the other pre-reset information, such as the processor operating mode. A different system may provide extensive storage for a sequence of PC address values in a first storage element and a sequence of other pre-reset information corresponding to each PC address value and selected for storage according to product or application requirements.

An unexpected reset may occur for a number of reasons. For example, an unexpected reset is usually a consequence of an asynchronous event causing the reset. An unexpected reset may also be due to receiving a reset-event notification from one or more watchdog timers which monitor one or more signals for an unexpected failure or an unexpected lack of activity. In another example, an unexpected reset may be due to noise or unexpected variations in a supply voltage which generates a spurious reset in a power control circuit. In a further example, a system operator might have activated a physical or software reset button. The system operator generally does not know what the processor is doing at the time the "reset button" is pushed. For example, the system operator may have noticed that the system appeared to be hung, or a certain kind of anomalous activity was being portrayed on an attached screen, or the like, and so the system operator made a determination to force a reset. A processor in such a "hung" state is generally not able to recover from such a situation or provide information to the system operator. After the reset, the system operator may want to know where in the program the processor was executing and what other state conditions existed prior to detecting a reset in order to try to understand whatever anomalous behavior was being observed. Since the reset is unexpected to the system, the processor information, including the PC address prior to the unexpected reset may be of value in determining at what address in the software and in what state the processor was executing. Such information may be useful in determining an event or events that caused the unexpected reset, as described in more detail below.

Figure 2:
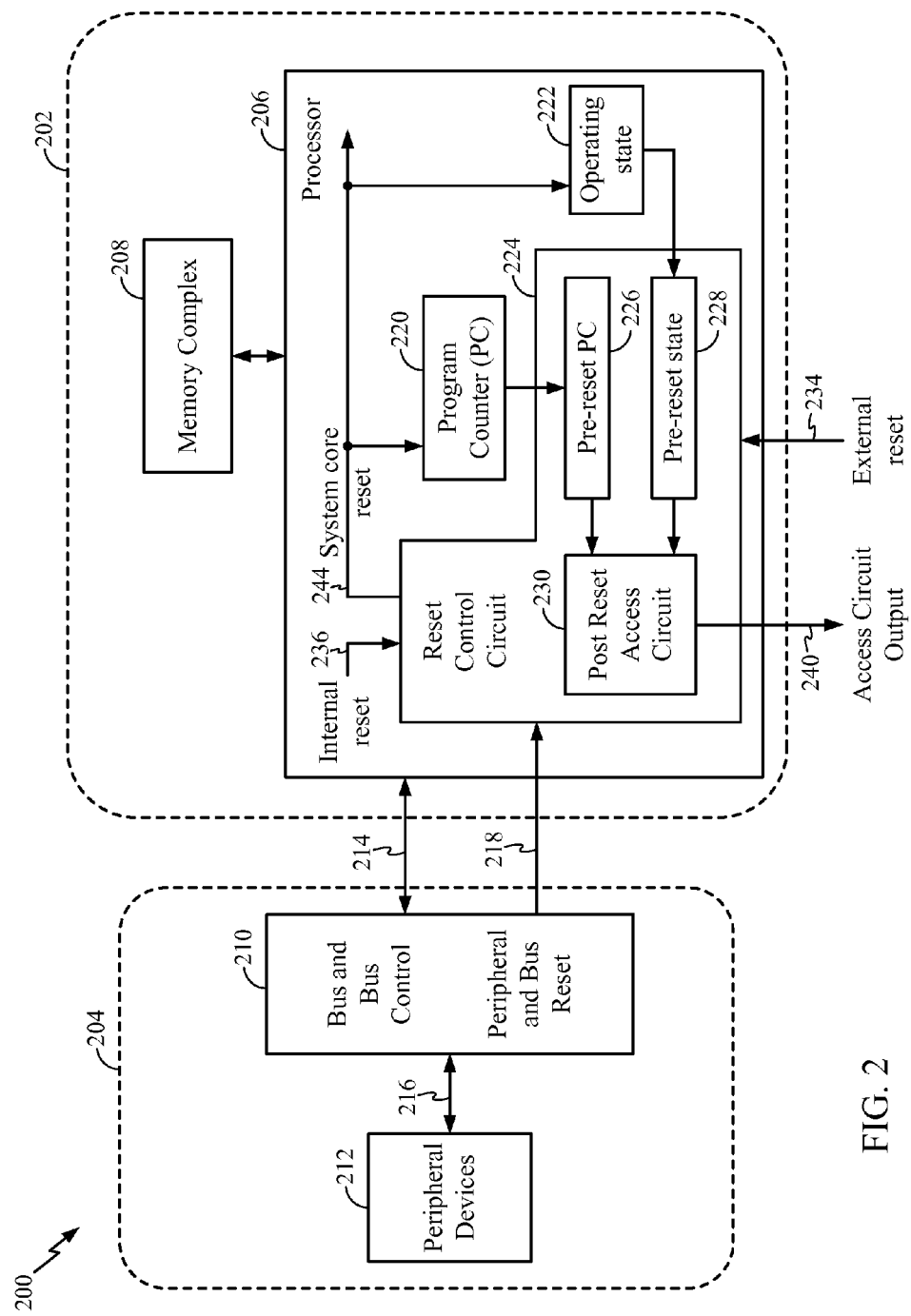
FIG. 2 shows an exemplary processing system in which an embodiment of the invention may be advantageously employed.

FIG. 2 shows an exemplary processing system 200 in which an embodiment of the invention may be advantageously employed. The exemplary processing system 200 may suitably be employed in components 125A, 125C, 125B, and 125D of FIG. 1. The processing system 200 includes a system core 202 coupled to external devices 204 by a bus 214. The system core 202 comprises a processor 206 and a memory complex 208. The memory complex 208 comprises multiple levels of instruction and data caches and a main memory. The system core 202 may include one or more processors and the number of processors required for a particular application may vary depending upon processing requirements and design constraints. Each of the processors in a multiprocessor core, such as exemplified by the processor 206, responds to a reset in the manner described below.

The external devices 204 include a shared bus and bus control circuit 210 coupled to external peripheral devices 212 by a peripheral bus 216. The external peripheral devices 212 may be a bus mastering device and may include a general purpose processor, a digital signal processor (DSP), an application specific processor (ASP) or the like. An external peripheral device may be a memory controller, a bridge device for interconnecting to another bus interconnect device, a peripheral device such as a hard disk controller, a universal serial bus (USB) controller, an interactive display device, a radio device coupling a controller to a transmitter and receiver, or the like. The external peripheral devices 212 may also include bus masters that utilize direct memory access (DMA) techniques for reading or writing data to the memory complex 208. The bus and bus control circuit 210 may generate a peripheral and bus reset signal 218.

The processor 206 includes a program counter (PC) 220, an operating state storage unit 222, and a reset control circuit 224. Other elements of the processor 206, such as a processor pipeline are not shown to focus on the inventive elements. The PC 220 holds an address of an instruction in a program being executed. The operating state storage unit 222 holds a current operating mode, such as one of the nine processing modes of an ARM processor. The reset control circuit 224 includes a pre-reset PC storage device 226, a pre-reset state storage device 228, and a post reset access circuit 230. The reset control circuit 224 is configured to automatically capture a pre-reset value or values of processor information stored in one or more processor registers, as part of a reset operation state machine and prior to changing selected elements of the processor information to their architecturally specified post reset value.

An external or an unexpected event may generate the peripheral and bus reset 218, an external reset 234, or an internal reset 236. The peripheral and bus reset 218 may be generated by a watchdog timer alert due to lack of bus activity on the bus 214 within a monitored time window. The external reset 234 may be generated due to spurious conditions occurring in a power circuit, for example due to a brown out situation or due to noise. The internal reset 236 may be generated due to program code operating in an unexpected manner that causes the internal reset 236 to be generated or may be generated, for example, by a thermal sensor associated with the processor indicating a temperature higher than a limit. In one embodiment, the peripheral and bus reset 218, the external reset 234, and the internal reset 236 may be logically ORed together to generate a combined reset. Also, a reset type indication may be stored in a pre-reset register that indicates which of the three resets 218, 234, or 236 or a combination of the three resets generated the combined reset. A diagnostic evaluation of the reset type indication may be helpful to isolate the unexpected event. For example, the unexpected event may be isolated to the external devices 204 if a peripheral and bus reset signal 218 occurred, to an external circuit such as a power supply circuit if an external reset 234 occurred, or to a software event if an internal reset 236 occurred.

While a direct reason for a reset may be determined from identifying one or a combination of the three resets 218, 234, or 236, such information does not generally convey where the processor was executing and under what other state it was executing. For example, a reset may be directly caused by internal reset 236 due to a thermal overload on the processor, but this does not provide any information on why the thermal overload occurred. However, by accessing a pre-reset PC address and any other available saved pre-reset state information, it may be determined, for example, that the processor was executing in the middle of a loop processing complex and power-intensive vector multiply accumulate operations when the internal reset 236 occurred which could be an indication of why the processor temperature was too high.

Upon recognizing the beginning of a reset, such as an unexpected reset, the current pre-reset value of the processor program counter (PC) 220 and a pre-reset value of the operating-state register 222, may be captured in the pre-reset PC storage device 226 and the pre-reset state storage device 228, respectively. After the capture of the pre-reset information, the system proceeds to an ending sequence of the unexpected reset which causes the PC 220 and operating state register 222 to be changed to the architecturally specified post reset values. The post reset access circuit 230 receives the pre-reset values stored in the storage devices 226 and 228 either serially, such as defined by a joint test action group (JTAG) hardware scan test circuit, or in parallel and provides the stored information on an access circuit output 240, which may provide a coupling mechanism for pre-reset information for diagnostic purposes. The pre-reset values stored in storage devices 226 and 228 may also be accessed by diagnostic programs operating on the processor 206. Such pre-reset capture storage devices, such as the pre-reset PC storage device 226 and the pre-reset state storage device 228, may maintain the pre-reset values until another reset occurs at which time the stored values would be overwritten by new pre-reset values.

In order to save the pre-reset values, the generation of a processor or system reset is configured to operate in accordance with an embodiment of the invention. Initially, after receiving a reset, the pre-reset values of the processor information, such as the PC address and other state values, are saved. After the pre-reset values are saved, a system core reset 244 is generated to reset the program counter (PC) 220, reset the operating state register 222, and reset the remaining system core circuits. Such an operation sequence may be controlled by a reset operation state machine. In one embodiment, a leading edge of the system core reset 244 may be used to capture a PC address stored in the program counter (PC) 220 in the pre-reset PC storage device 226 and may also be used to capture an operating state value stored in the operating state register 222 in the pre-reset state storage device 228. The trailing edge or active state of the system core reset 244 may then be used to reset the PC register 220, the operating state register 222 and the rest of the system core to their architecturally defined post reset state. In an alternative embodiment, a sequence of capture signals followed by the system core reset 244 may be used to capture the pre-reset processor state information and then, after the pre-reset processor state information is safely captured, the system core is reset. For example, a reset condition capture latch followed by a counter may be included in the reset control circuit 224. The reset condition capture latch is used to detect a reset condition and may also be used to enable the counter. The counter is incremented each clock cycle for a predetermined period in response to detection of the reset condition, with pre-reset values being captured by one or more corresponding capture signals in response to one or more early count values, followed by the system reset, which includes changing the PC and state registers to the architecturally specified post reset values, occurring at a later count value. The reset condition capture latch and the counter returns to an initial state in response to completing the system reset action.

In another embodiment, a history of pre-reset processor state information may be captured, saved, and made available after the system core is reset. For example, the pre-reset PC storage device 226 may be increased in capacity to N storage locations. Similarly, the pre-reset state storage device 228 may also be increased in capacity to N storage locations. The pre-reset PC storage device 226 and pre-reset state storage device 228 both keep a running list of the last N PC addresses and the last N state values prior to the system reset. The pre-reset PC storage device 226 and pre-reset state storage device 228 are generally not reset. A reset condition capture latch, operating in the reset control circuit 224, may be used to detect a reset condition and may also be used to enable a counter. The counter is incremented each clock cycle for X clock cycles in response to detection of the reset condition, with pre-reset PC and state values being captured in their corresponding storage devices during the period of X clock cycles, followed by the system core reset 244, which includes changing the PC and state registers to their architecturally specified post reset values, occurring at a later count value. The reset condition capture latch and the counter return to an initial state in response to completing the system reset action. The sequence of N pre-reset PC and state values may be read by post reset processing routines and stored values are overwritten during subsequent operations. Further extensions may be realized for saving processor information including saving a sequence of PC and other state information just before a reset condition is detected and further saving such state to an extended storage device as may be available, for example, coupled to the access circuit output 240. For example, a sequence of PC and other state information may be transferred to the extended storage device upon detection of a reset condition, such as may be identified by a reset condition capture latch.

Figure 3:
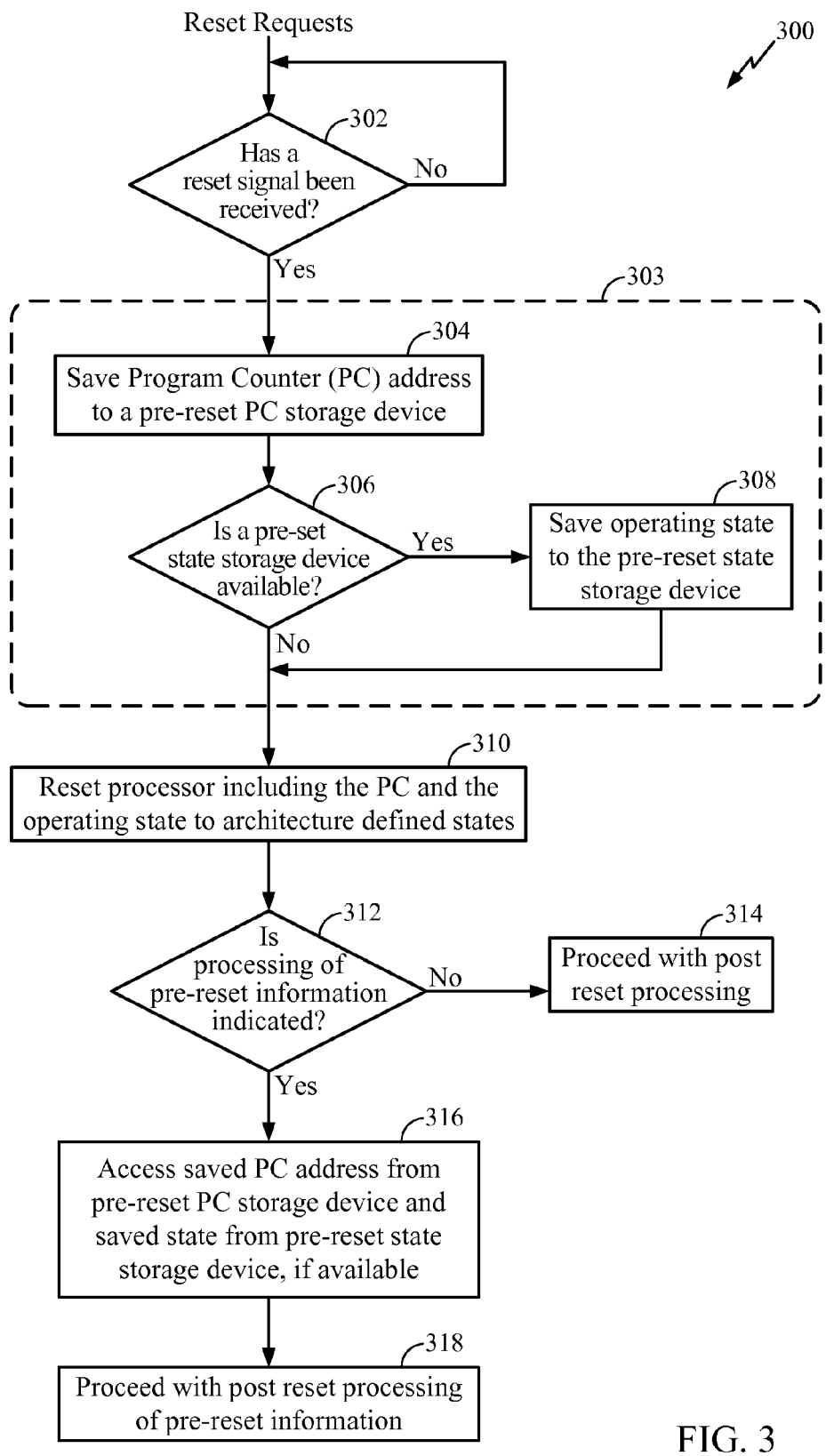
FIG. 3 illustrates an exemplary process for responding to a reset in which an embodiment of the invention may be advantageously employed.

FIG. 3 illustrates an exemplary process 300 for responding to a reset in which an embodiment of the invention may be advantageously employed. At block 302, a determination is made whether a reset signal has been received. If no reset signal has been received, the process 300 waits until a reset signal arrives. If a reset signal is received, the process 300 proceeds to block 304. It is noted that the outlined section 303, having blocks 304, 306, and 308, represents exemplary blocks for saving pre-reset processor information. At block 304, an address in a program counter (PC), such as the PC 220, is saved in a pre-reset PC storage device, such as the pre-reset PC storage device 226 of FIG. 2. At block 306, a determination is made whether a pre-reset state storage device is available. For example, such determination may be made by including or not including a pre-reset state storage device in a circuit. If a pre-reset state storage device is available, the process 300 proceeds to block 308. At block 308, an operating state stored in an operating state register, such as the operating state register 222, is saved in the pre-reset state storage device, such as the pre-reset state storage device 228. It is anticipated that other processor information that may be lost due to a reset may also be stored in a pre-reset storage device for further processing. If a pre-reset state storage device is not available, the process 300 proceeds to block 310. Thus, a sequence of block 304, 306, 310 represents a system that saves the pre-reset PC address as a basic level of pre-reset information. Another sequence of block 304, 306, 308, and 310 represents a system that saves the pre-reset PC address and that saves an element of the other pre-reset processor information, such as the processor operating mode in the pre-reset state storage device.

In an alternative embodiment, the outlined section 303 may be implemented by connecting block 304 to block 310 without requiring blocks 306 and 308. In another embodiment, the outline section 303 may be implemented by connecting block 304 to block 308 which connects to block 310 without requiring block 306. In a further embodiment, the outlined section 303 may be implemented by connecting block 308 in parallel with block 304 without requiring block 306. Further, the storage capacity of the pre-reset PC storage device in block 304 and the storage capacity of the pre-reset state storage device in block 308 may vary depending on requirements of a particular implementation.

At block 310, the processor, including the PC and the operating state registers, are reset to architecture defined states. The pre-reset storage devices are not reset and maintain the pre-reset values stored therein. At block 312, a determination is made whether processing of pre-reset information is indicated, such as may be indicated for diagnostic processing or for adaptive system processing of pre-reset information, for example. If pre-reset information processing has not been indicated, the process 300 proceeds to block 314. At block 314, the process 300 proceeds with post reset processing. If pre-reset processing has been indicated, the process 300 proceeds to block 316. At block 316, the PC address saved in the pre-reset PC storage device 226 and the operating state saved in the pre-reset state storage device 228, if available, are accessed for processing. At block 318, the process 300 proceeds with post reset processing of the pre-reset information. Receiving another reset signal returns the process 300 to block 304.

The various illustrative logical blocks, modules, circuits, elements, or components described in connection with the embodiments disclosed herein may be implemented using an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, a special purpose controller, or a micro-coded controller. A system core may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied in hardware and software executed by a processor. The processor 206 may access instructions and data from the memory complex 208 in the execution of a program, for example. The software comprising one or more processor programs is stored as non-transitory signals on a computer readable storage medium. The computer readable storage medium may be directly associated with a processor, such as processor 206 or a processor in one of the peripheral devices 212 or accessible, for example through the bus and bus control circuit 210 or other interfacing means. The storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques. The computer readable storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

While the invention is disclosed in the context of illustrative embodiments for use in processor systems it will be recognized that a wide variety of implementations may be employed by persons of ordinary skill in the art consistent with the above discussion and the claims which follow below. For example, fixed function implementations may also utilize various embodiments of the present invention.

What is claimed is:

1. A method for saving pre-reset information in a processor, the method comprising:
updating pre-reset information in a first storage element on the processor during processor operations and prior to the occurrence of a processor reset, wherein the pre-reset information changes in response to the processor operations;
generating a processor reset by a reset control circuit after a history of the pre-reset information has been saved from the first storage element on the processor to a second storage element on the processor in response to detection of a reset condition, wherein the second storage element is separate from processor operating registers, wherein the history of the pre-reset information is saved from the first storage element to the second storage element over a period of processor operations in response to capture signals operating at a clock rate of the processor according to the reset control circuit prior to the processor reset, wherein the second storage element holds the history of pre-reset information after the processor has been reset and the first storage element has been overwritten during processor operations occurring after the processor reset, wherein the history of pre-reset information is accessible from the second storage element for evaluation by the processor after the processor reset has occurred;

saving the pre-reset information in the second storage element in response to the capture signals according to an adjustable counter configured to sample state values every clock cycle of the processor to create a running list of N previous state values; and resetting the first storage element after saving the processor pre-reset information to the second storage element upon detection of the reset condition.

2. The method of claim 1, wherein the first storage element is a processor program counter (PC) that holds an address of an instruction fetched for execution.

3. The method of claim 1, wherein the first storage element is a processor operating mode register that holds an operating mode of the processor.

4. The method of claim 1, wherein the second storage element is a storage device that holds a plurality of values of the pre-reset information and that is accessible by a post reset program or a diagnostic circuit.

5. The method of claim 4, wherein the diagnostic circuit is a joint test action group (JTAG) hardware scan test circuit.

6. The method of claim 1 further comprising:
storing a predefined instruction address in a processor program counter (PC) in response to the processor reset, wherein the predefined instruction address directs the processor to a post reset processing routine fir accessing the history of pre-reset information.

7. An apparatus comprising:
a reset detection circuit configured to detect an unexpected reset condition, to generate capture signals at a plurality of time points corresponding to processor operations, and to activate a processor reset after a reset-time capture signal has been generated;
a first storage element storing pre-reset information that changes due to processor operations;
a second storage element whose contents remains unchanged and accessible after the processor reset, wherein the second storage element is separate from processor operating registers; and
a control circuit configured to copy the pre-reset information from the first storage element to the second storage element over a period of processor operations in response to the capture signals operating at a clock rate of the processor to create a history of pre-reset information as it changes over the plurality of time points and prior to contents of the first storage element being overwritten in response to processor operations occurring after the processor reset.

8. The apparatus of claim 7, wherein the second storage element stores the pre-reset information copied from the first storage element to save a running list of previous processor state values.

9. The apparatus of claim 7, wherein the second storage element stores the pre-reset information copied from the first storage element in response to a first reset signal generated in response to the detected unexpected reset condition and before the processor reset.

10. The apparatus of claim 7, wherein the first storage element is a processor program counter (PC) that holds an address of an instruction fetched for execution prior to the processor reset.

11. The apparatus of claim 7, further comprising:
a diagnostic interface configured to provide access to the history of pre-reset information from the second storage element for diagnostic evaluation of the pre-reset information.

12. The apparatus of claim 11, wherein the diagnostic interface is configured for direct software access of the history of pre-reset information for diagnostic software evaluation on the processor.

13. The apparatus of claim 1, wherein diagnostic interface is configured for hardware access of the history of pre-reset information through a joint test action group (JTAG) interface.

14. The apparatus of claim 7 further comprising:
an adjustable counter operating at a clock rate of the processor and configured to sample state values using the capture signals at the plurality of time points based on counter values to create a history of N previous state values.

15. A non-transitory computer-readable medium comprising information which, when executed by a processor, causes the processor to perform operations comprising:
accessing from a second storage element on a processor a history of pre-reset information created from N samples of pre-reset information captured from a first storage element over a period of processor operations in response to N capture signals operating at a clock rate of the processor according to a control circuit and saved to the second storage element prior to an unexpected reset of the processor; and
determining a pre-reset processor operating state on the processor based on the history of pre-reset information, wherein the second storage element is separate from processor operating registers.

16. The non-transitory computer-readable medium of claim 15, wherein the history of pre-reset information comprises:
N samples of program counter (PC) addresses that indicate a sequence of instructions in a program prior to a time the unexpected processor reset occurred.

17. The non-transitory computer-readable medium of claim 15, wherein the history of pre-reset information comprises:
a sequence of N state values sampled by the N capture signals, the sequence of N state values that indicates operating states of a program prior to a time the unexpected processor reset occurred.

18. The method of claim 1, wherein the processor reset is in response to an unexpected condition that occurred in a system comprising the processor, wherein the history of pre-reset information comprises:
information that indicates whether the processor reset was caused by an unexpected condition internal to the processor or by an unexpected condition external from the processor.

19. The method of claim 18, wherein, when the processor reset was caused by an unexpected condition external to the processor, the history of pre-reset information comprises:

information that indicates whether the unexpected condition external to the processor was in response to an unexpected condition in an external device or an unexpected condition in a power supply circuit.

20. The non-transitory computer-readable medium of claim 15, further comprising:
accessing in the processor the history of pre-reset information from the second storage element in response to a diagnostic mode indication for the purpose of diagnosing one or more conditions that caused the unexpected processor reset.

21. The non-transitory computer-readable medium of claim 15 further comprising:
capturing the pre-reset processor information from a first storage element in a second storage element over a period of processor operations in response to the N capture signals generated by the control circuit to create the history of pre-reset information in the second storage element, wherein the second storage element is separate from the processor operating registers and wherein the second storage element holds the history of pre-reset information after an unexpected processor reset has occurred.

22. The method of claim 1 further comprising:
generating the capture signals based on a plurality of count values of a counter in the control circuit, wherein a new count value is generated each clock cycle over a defined period of processor operations.

23. An apparatus comprising:
means for generating capture signals at a plurality of time points corresponding to processor operations and for activating a processor reset in response to detecting an unexpected reset condition;
first means for storing adapted to store pre-reset information that changes due to processor operations;
second means for storing adapted to store information that remains unchanged and accessible after the processor reset, wherein the second means for storing is separate from processor operating registers; and
means for copying the pre-reset information from the first means for storing to the second means for storing over a period of processor operations in response to the capture signals to create a history of pre-reset information stored in the second means for storing and prior to contents of the first means for storing being overwritten in response to processor operations occurring after the processor reset.

24. The apparatus of claim 23, further comprising:
means for accessing the history of pre-reset information from the second means for storing for diagnostic evaluation of the pre-reset information.

25. The non-transitory computer-readable medium of claim 15, wherein the contents of the first storage element are overwritten in response to the unexpected processor reset.

26. The apparatus of claim 23, further comprising:
means to sample state values at the plurality of time points to capture the pre-reset information as it changes over the plurality of time points to create the history of pre-reset information.

27. A method for saving pre-reset information in a processor, the method comprising:
updating processor state information in a first storage element on the processor during processor operations and prior to detecting a reset condition;
generating N capture signals according to a counter circuit configured to sample the updated processor state information at selected count values of the counter circuit;
storing the sampled updated processor state information in a second storage element separate from the first storage element to create a running list of N previous state values in the second storage element; and
resetting the first storage element after saving the Nth previous state value in the second storage element and after detection of the reset condition.

28. The method of claim 27 further comprising:
accessing the running list of N previous state values from the second storage element for evaluation by the processor after the processor reset has occurred.

29. The method of claim 27 further comprising:
accessing the running list of N previous state values from the second storage element through a diagnostic interface for diagnostic evaluation after the processor reset has occurred.

30. The method of claim 27, wherein each sample of the updated processor state information includes a program counter address and a processor operating state value that is current at the time of the sample.

* * * * *